United States Patent
Fang et al.

(10) Patent No.: US 8,278,931 B2
(45) Date of Patent: Oct. 2, 2012

(54) ANISOTROPY ORIENTATION IMAGE FROM RESISTIVITY MEASUREMENTS FOR GEOSTEERING AND FORMATION EVALUATION

(75) Inventors: Sheng Fang, Houston, TX (US);
Andrew D. Kirkwood, Houston, TX (US); Gulamabbas Merchant, Houston, TX (US); Eric Hart, Galveston, TX (US); Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 414 days.

(21) Appl. No.: 12/501,555

(22) Filed: Jul. 13, 2009

(65) Prior Publication Data

US 2010/0007348 A1      Jan. 14, 2010

Related U.S. Application Data

(60) Provisional application No. 61/080,441, filed on Jul. 14, 2008.

(51) Int. Cl.
*G01V 3/00* (2006.01)
(52) U.S. Cl. .................................. 324/338; 324/339
(58) Field of Classification Search .......... 324/323–375; 367/1–86; 166/244.1–403, 250.01–250.17; 73/152.01–152.62; 702/1–199; 343/703, 343/709, 718–719; 175/1, 40–50; 250/253–266
See application file for complete search history.

(56) References Cited

U.S. PATENT DOCUMENTS

| | | | |
|---|---|---|---|
| 5,045,795 A * | 9/1991 | Gianzero et al. ............. | 324/342 |
| 6,969,994 B2 | 11/2005 | Minerbo et al. | |
| 7,202,670 B2 * | 4/2007 | Omeragic et al. ............ | 324/338 |
| 7,375,530 B2 * | 5/2008 | Chemali et al. .............. | 324/339 |
| 7,382,135 B2 | 6/2008 | Li et al. | |
| 7,483,793 B2 | 1/2009 | Wang et al. | |
| 7,659,722 B2 * | 2/2010 | Bittar ............................ | 324/337 |
| 2006/0038571 A1 * | 2/2006 | Ostermeier et al. .......... | 324/338 |
| 2006/0125479 A1 * | 6/2006 | Chemali et al. .............. | 324/339 |

OTHER PUBLICATIONS

Hagiwara, T. 1996. EM Log Response to Anisotropic Resistivity in Thinly Laminated Formations with Emphasis on 2-MHz Resistivity Devices. Paper 28426-PA SPE FE. 11 (4): 211-217.
Klein J. D. 1991. Induction Log Anisotropy Corrections. Paper T, presented at SPWLA 32nd Annual Logging Symposium, Jun. 16-19.
Zhdanov, M. S., Kennedy W. D., Cheryauka A. A. and Peksen, E. 2001. Principles of Tensor Induction Well Logging in Deviated Well in and Anisotropic Environment. Paper R. presented at SPWLA 42nd Annual Logging Symposium, Jun. 17-20.
Hagiwara, T. 1995. Anisotrpoic Shale and Induction Log Shoulder Bed Corrections for Deviated Boreholes. Paper Z, presented at SPWLA 36th Annual Logging Symposium, Jun. 26-29. Moran, J. H., and Gianzero, S., 1979. Effects of Formation Anisotropy on Resistivity-logging Measurements, Geophysics, 44 (7): 1266-1286.
Kunz, K. S., and Moran J. H., 1958. Some Effects of Formation Anisotropy on Resistivity Measurements in Boreholes. Geophysics, 23 (4): 770-194.
Sclumberger, C., Sclumberger, M. and Leonardon, E. G. 1934. Some Observations concerning electrical measurements in anisotropic media and their interpretations: Transactions of American Institute of Mining Engineers, 110: p. 159.

* cited by examiner

Primary Examiner — Jermele M Hollington
Assistant Examiner — Alesa Allgood
(74) Attorney, Agent, or Firm — Cantor Colburn LLP

(57) ABSTRACT

A method for providing an image of a formation surrounding a wellbore, includes: obtaining an apparent conductivity curve from main components of resistivity measurements of the formation; performing fitting for cross-components of the resistivity measurements; calculating scaling factors from the cross-component data; scaling apparent conductivity data by the calculated scaling factors; and plotting the scaled conductivity data to provide the image of the anisotropic formation. A system and a computer program product are disclosed.

20 Claims, 10 Drawing Sheets

ANISOTROPY ORIENTATION IMAGE FROM RESISTIVITY MEASUREMENTS FOR GEOSTEERING AND FORMATION EVALUATION

CROSS REFERENCE TO RELATED APPLICATION

This application is a Non Provisional application of U.S. Provisional Ser. No. 61/080,441, filed Jul. 14, 2008, the contents of which are incorporated by reference herein in their entirety.

BACKGROUND OF THE INVENTION

1. Field of the Invention

The invention is related generally to oil field exploration and in particular to use of at least one of multi-component induction measurements and propagation measurements for geosteering and formation evaluation.

2. Description of the Related Art

Electromagnetic induction and wave propagation logging tools are commonly used for determination of electrical properties of formations surrounding a borehole. These logging tools give measurements of apparent resistivity (or conductivity) of the formation that, when properly interpreted, are diagnostic of the petrophysical and other properties of the formation and the fluids therein.

In various environments, such as those having thinly laminated sand-shale sequences or shaly-sand formations, the formation electrical anisotropy becomes important in determining the hydrocarbon saturation from the resistivity measurements. Due to physical complexities of the formation, determining the electrical anisotropy can be complicated.

For example, intrinsic and macroscopic properties may give rise to anisotropy (i.e., directional dependence). Unfortunately, techniques presently available do not adequately provide for characterization of anisotropy while drilling. However, should adequate characterization of anisotropy be available, one should be able to use the characterization information for geosteering (i.e., steering a drill during a drilling process).

There is a need for advanced methods for providing determinations of formation anisotropy. Preferably, the methods should consistently provide accurate and reliable data, be computationally efficient and useful for implementation while drilling a wellbore, thus providing input to geosteering processes.

BRIEF SUMMARY OF THE INVENTION

The above-discussed and other features and advantages of the present invention will be appreciated and understood by those skilled in the art from the following detailed description and drawings.

An embodiment of the invention includes method for providing an image of a formation surrounding a wellbore, the method including: obtaining a curve from main components of resistivity measurements of the formation; fitting cross-components of the resistivity measurements; calculating scaling factors from the cross-component data; scaling apparent conductivity data by the calculated scaling factors; and plotting the scaled conductivity data to provide the image of the anisotropic formation.

Another embodiment of the invention includes a system for imaging a formation surrounding a wellbore during a drilling procedure, the system including: a drill string including a logging instrument including at least one sensor for collecting resistivity measurement data; and a processor loaded with machine readable and machine executable instructions including instructions for obtaining a conductivity curve from main components of resistivity measurements of the formation; fitting cross-components of the resistivity measurements; calculating scaling factors from the cross-component data; scaling apparent conductivity data by the calculated scaling factors; and providing input to a geosteering device.

A further embodiment of the invention includes a computer program product including computer executable instructions stored on computer readable media, the product including instructions providing an image of a formation by: obtaining a curve from main components of resistivity measurements of the formation; fitting cross-components of the resistivity measurements; calculating scaling factors from the cross-component data; scaling apparent conductivity data by the calculated scaling factors; and plotting the scaled conductivity data to provide the image of the anisotropic formation.

BRIEF DESCRIPTION OF THE DRAWINGS

Referring now to the drawings wherein like elements are numbered alike in the several figures, where.

DETAILED DESCRIPTION OF THE INVENTION

Disclosed are methods and apparatus for estimating variation of anisotropy, relative dip and azimuth of formations encountered in oil field exploration. The techniques presented make use of resistivity measurements, including main and cross components of the resistivity measurements. The results provide users with meaningful data such as may be used as an input for geosteering or subsequent formation evaluation. Images generated using the technology provided herein may be color coded to aid in interpretation.

Figure 1:
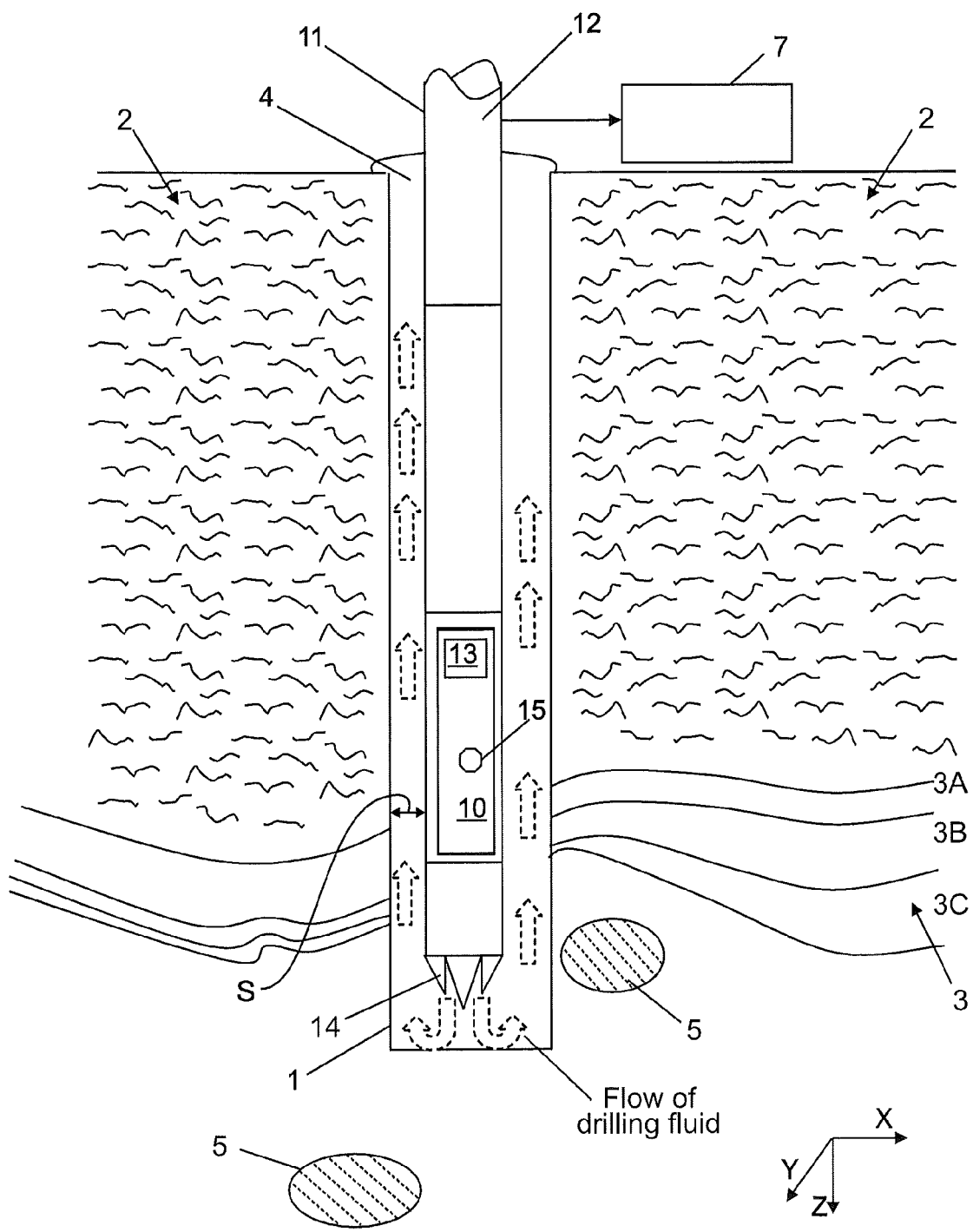
FIG. 1 illustrates an exemplary embodiment of a drill string that includes a logging instrument.

Refer now to FIG. 1 where aspects of an apparatus for drilling a wellbore 1 (also referred to as a "borehole") are shown. As a matter of convention, a depth of the wellbore 1 is described along a Z-axis, while a cross-section is provided on a plane described by an X-axis and a Y-axis.

In this example, the wellbore 1 is drilled into the Earth 2 using a drill string 11 driven by a drilling rig (not shown) which, among other things, provides rotational energy and downward force. The wellbore 1 generally traverses subsurface materials, which may include various formations 3 (shown as formations 3A, 3B, 3C). One skilled in the art will recognize that the various geologic features as may be encountered in a subsurface environment may be referred to as "formations," and that the array of materials down the borehole (i.e., downhole) may be referred to as "sub-surface materials." That is, the formations 3 are formed of sub-surface materials. Accordingly, as used herein, it should be considered that while the term "formation" generally refers to geologic formations, and "sub-surface material," includes any materials, and may include materials such as fluids, gases, liquids, and the like.

The drill string 11 includes lengths of drill pipe 12 which drive a drill bit 14. In this example, the drill bit 14 also provides a flow of a drilling fluid 4, such as drilling mud. The drilling fluid 4 is often pumped to the drill bit 14 through the drill pipe 12, where the fluid exits into the wellbore 1. This results in an upward flow of drilling fluid 4 within the wellbore 1. The upward flow generally cools the drill string 11 and components thereof, carries away cuttings from the drill bit 14 and prevents blowout of pressurized hydrocarbons 5.

The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from well logging operations. Generally, a layer of materials will exist between an outer surface of the drill string 11 and a wall of the wellbore 1. This layer is referred to as a "standoff layer," and includes a thickness, referred to as "standoff, S."

The drill string 11 generally includes equipment for performing "measuring while drilling" (MWD), also referred to as "logging while drilling" (LWD). Performing MWD or LWD generally calls for operation of a logging instrument 10 that in incorporated into the drill string 11 and designed for operation while drilling. Generally, the logging instrument 10 adapted for MWD is coupled to or includes an electronics package which is also on board the drill string 11, and therefore referred to as "downhole electronics 13," and "electronics unit 13" and by other similar terms.

As used herein, the logging tool 10 may also be referred to as an "instrument 10" or a "multi-component induction tool 10," and by reference number "10" without implying any particular limitation of apparatus for deploying the technology. Non-limiting examples of the tool 10 are commonly referred to as an "induction logging instrument" and may include multi-spacing, multi-frequency propagation instruments, as well as those known as "azimuthal propagation resistivity tools."

Generally, the downhole electronics 13 provides for at least one of operational control and data analysis. Among other things, the downhole electronics 13 receives input from at least one on-board sensor 15. Accordingly, the downhole electronics 13 may include, without limitation, a power supply, a transformer, a battery, a processor, memory, storage, at least one communications interface and the like. The electronics unit may include a signal generator and power amplifiers (not shown), which cause alternating currents of selected frequencies to flow through transmitter coils in the sensor 15.

In some embodiments, the electronics unit 13 includes receiver circuits (not shown) for detecting voltages induced in receiver coils in the sensor 15, and circuits for processing these received voltages (not shown) into signals representative of the conductivities of various layers 3A-3C of the formations 3. As a matter of convenience, the electronics unit 13 may include signal telemetry to transmit conductivity related signals to the surface of the Earth 2 for further processing. Alternatively, the electronics unit 13 may store data in an appropriate recording device (not shown) for processing after the instrument 10 is withdrawn from the wellbore 1.

Often, the logging instrument 10 and the downhole electronics 13 are coupled to topside equipment 7. The topside equipment 7 may be included to further control operations, provide greater analysis capabilities as well as data logging and the like. A communications channel (not shown) may provide for communications to the topside equipment 7, and may operate via pulsed mud, wired pipe, and other technologies as are known in the art.

Generally, data from the logging instrument 10 provide users with enhanced capabilities. For example, data made available from MWD evolutions may be useful as inputs to geosteering of the drill string 11 and the like.

Figure 2:
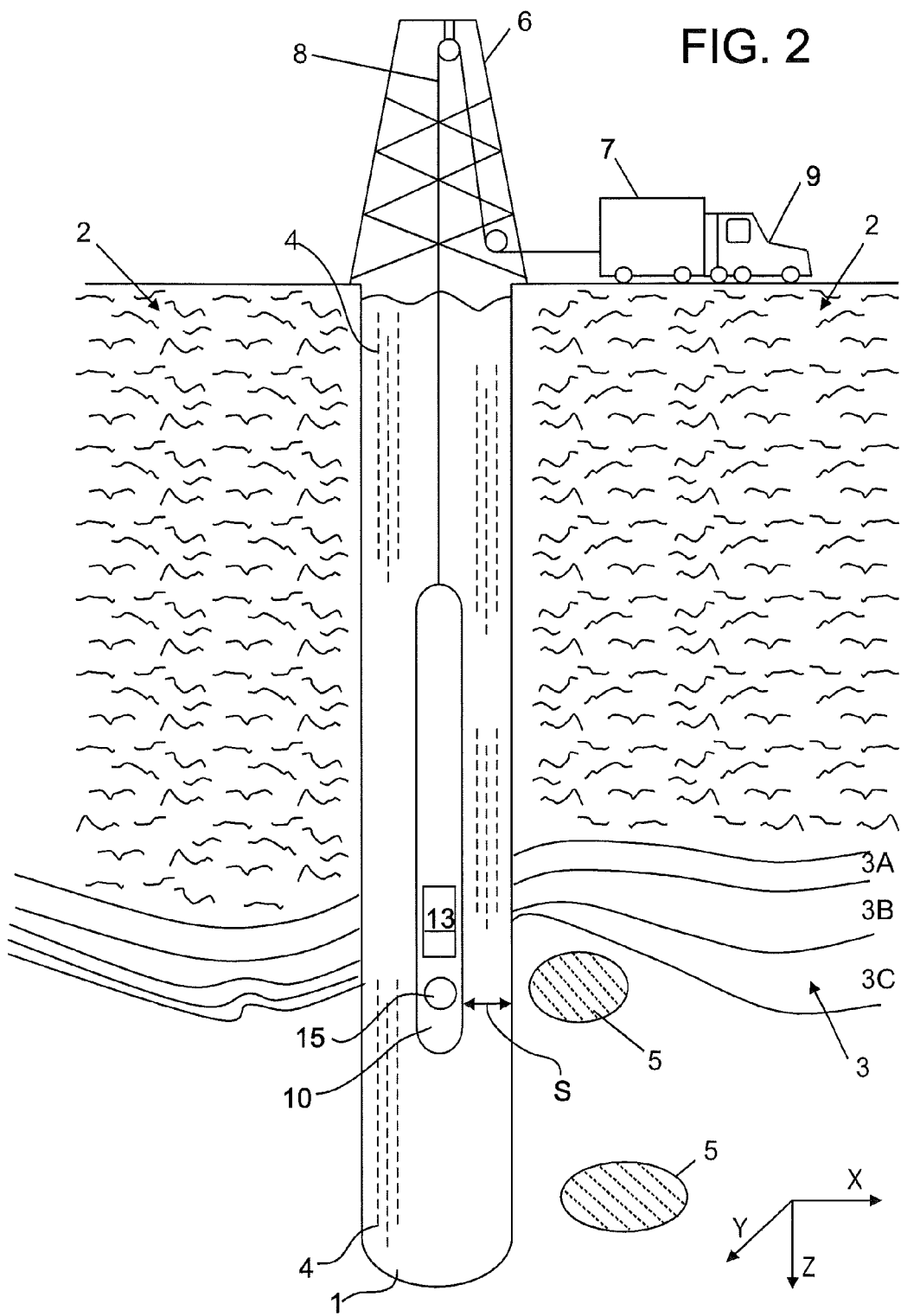
FIG. 2 illustrates an exemplary embodiment for well logging with an instrument deployed by a wireline.

Referring now to FIG. 2, an embodiment of the logging instrument 10 adapted for wireline logging is shown disposed in a wellbore 1. As a matter of convention, the depth of the wellbore 1 is described along a Z-axis, while a cross-section is provided on a plane described by an X-axis and a Y-axis. Prior to well logging with the logging instrument 10, the wellbore 1 is drilled into the Earth 2 using drilling equipment, such as the equipment shown in FIG. 1.

In some embodiments, the wellbore 1 has been filled, at least to some extent, with drilling fluid 4. The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from well logging operations. Generally, a layer of materials will exist between an outer surface of the logging instrument 10 and a wall of the wellbore 1. This layer is referred to as a "standoff layer," and includes a thickness, referred to as "standoff, S."

The logging instrument 10 used in wireline logging is lowered into the wellbore 1 using a wireline 8 deployed by a derrick 6 or similar equipment. Generally, the wireline 8 includes suspension apparatus, such as a load bearing cable, as well as other apparatus. The other apparatus may include a power supply, a communications link (such as wired or optical) and other such equipment. Generally, the wireline 8 is conveyed from a service truck 9 or other similar apparatus (such as a service station, a base station, etc, . . . ). Often, the wireline 8 is coupled to topside equipment 7. The topside equipment 7 may provide power to the logging instrument 10, as well as provide computing and processing capabilities for at least one of control of operations and analysis of data.

Generally, the logging instrument 10 includes apparatus for performing measurements "downhole" or in the wellbore 1. Such apparatus include, for example, at least one on-board sensor 15. Exemplary sensors 15 may include a set of coils to provide an induction logging instrument. The sensors 15 may communicate with the downhole electronics 13. The measurements and other sequences as may be performed using the logging instrument 10 are generally performed to ascertain and qualify a presence of hydrocarbons 5.

One skilled in the art will recognize that certain aspects of the teachings herein may be applied in either one or both of embodiments that include logging while drilling (LWD/MWD) and wireline logging. Accordingly, the invention disclosed herein is not limited to embodiments presented, and may include any type of subterranean measurement apparatus now known or later devised and as deemed practicable. In short, the well logging tool 10 may includes adaptations as may be necessary to provide for operation during various deployments, including during drilling or after a drilling process has been undertaken or completed.

Figure 3:
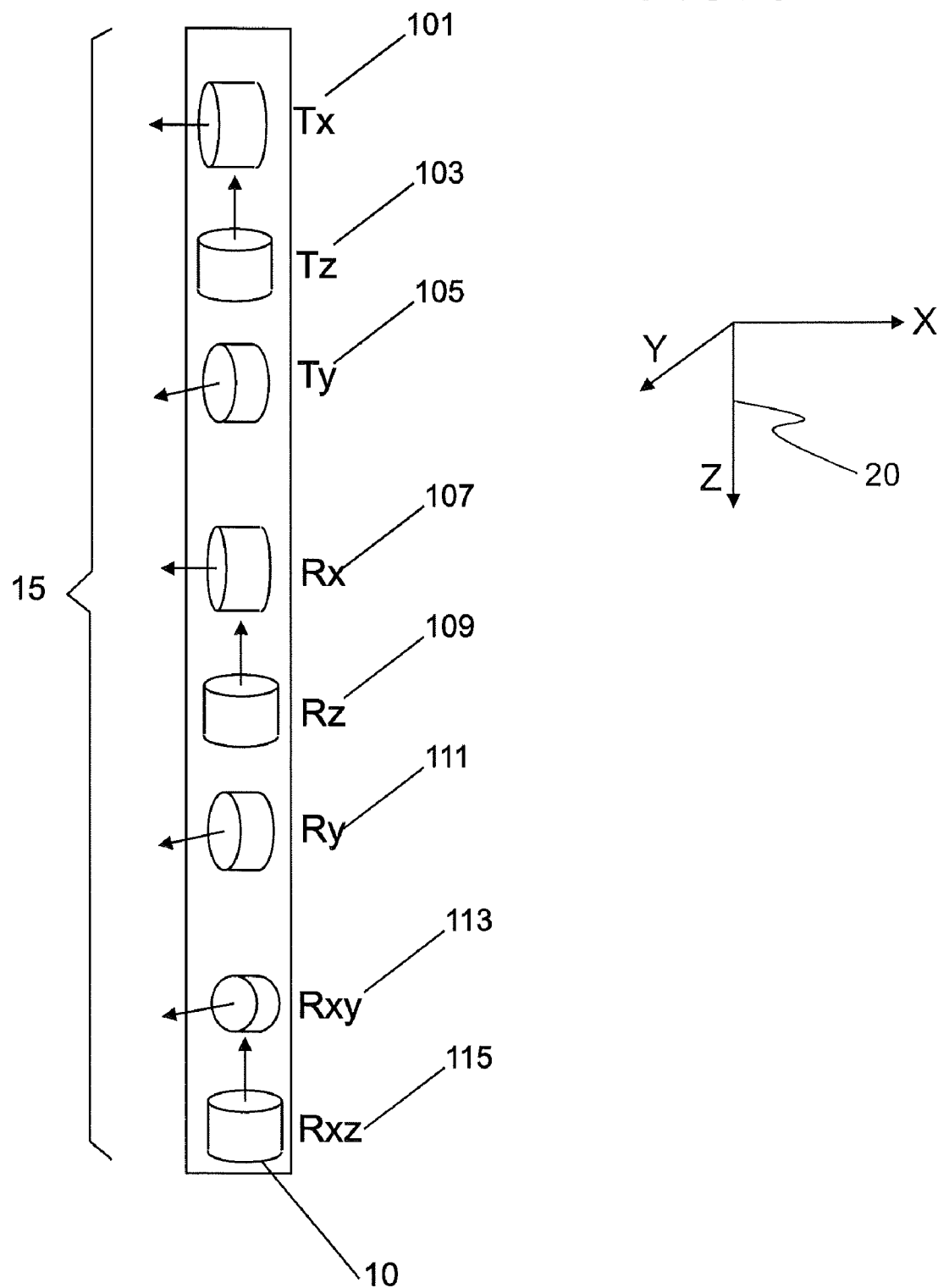
FIG. 3 depicts aspects of a sensor for a well logging instrument.

Referring to FIG. 3, one embodiment of the sensor 15 includes a set of coils further including transmitter coils and receiver coils as shown. Three transmitter coils 101, 103 and 105, referred to as the $T_x$, $T_z$, and $T_y$ transmitters are substantially orthogonally oriented (the z-axis being along the longitudinal axis of the tool, as depicted in the legend). The transmitter coils 101, 103 and 105 generate magnetic fields for obtaining measurements in the formations 3 surrounding the wellbore 1.

Corresponding to the transmitter coils 101, 103 and 105 are receiver coils 107, 109 and 111, referred to as the $R_x$, $R_z$, and $R_y$ receivers, respectively. The receiver coils 107, 109 and 111 measure aspects of the corresponding magnetic fields, and are also are substantially orthogonally oriented to each other. Additional receiver coils 113 and 115 may be included and measure two cross-components $H_{xy}$, and $H_{xz}$ of the magnetic field (H) produced by the x-component transmitter.

Other embodiments of the tool 10 may include those, for example, with side-by-side transmitter and receiver coils, and those having other arrangements of transmitters and receivers. Varying number of coils may be used. Therefore, it should be recognized this FIG. 3 depicts one embodiment of the well logging tool 10, and is not limiting thereof. Further, in other embodiments, the additional coils 113, 115 are not included. Non-limiting and further examples include embodiments having transmitter coils and receiver coils with other or varying orientations.

It should be recognized that the sensor 15 may be operated with a variety of currents, I, voltages, V, and frequencies, f. Accordingly, the sensor 15 (and aspects thereof, such as a power supply) may be, at least in some embodiments, controlled by the electronics unit 13.

More information regarding the tool 10 may be had by turning to the paper "A New Multicomponent Induction Logging Tool to Resolve Anisotropic Formations" by Kriegshäuser, et al, SPWLA 41$^{st}$ Annual Logging Symposium, Jun. 4-7, 2000, the disclosure of which is incorporated by reference herein in its entirety.

As discussed herein, and for convention, there are four coordinate systems involved in the processing of multi-component induction logging data. The four coordinate systems include one for each of the Earth 2, the formation 3, the tool 10 and the sensor 15. In typical embodiments, and by convention herein, the Earth 2 coordinate system has a z-axis Z in the direction of gravity, an x-axis X pointing to the magnetic North, and a y-axis Y in the direction of magnetic East. The other three coordinate systems are defined relative to the Earth coordinate system 20, depicted in FIG. 4A.

Figure 4A:
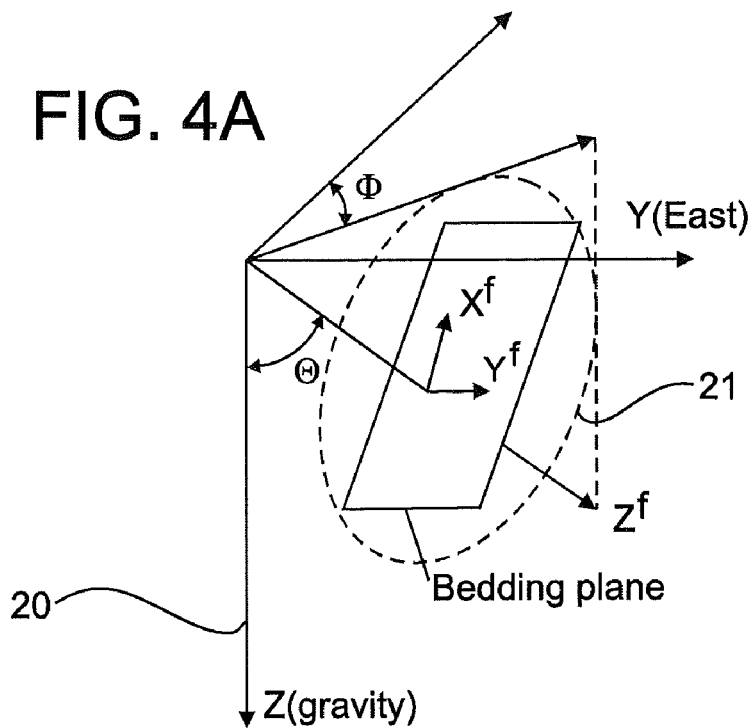
FIG. 4A and FIG. 4B, collectively referred to herein as FIG. 4, depict an Earth coordinate system with a formation coordinate system and the Earth coordinate system with a tool coordinate system.

Referring to FIG. 4A, the Earth coordinate system 20 is shown, with the axes as described in the preceding paragraph. The formation coordinate system 21 is also depicted, and shown relative to the Earth coordinate system 20. An z-axis $Z^f$ of the formation coordinate system 21 is normal to a bedding plane 5, while an x-axis $X^f$ and a y-axis $Y^f$ are on the bedding plane, each of the axes ($Z^f$, $X^f$, $Y^f$) being orthogonally oriented. Two formation angles, depicted as a formation dip angle ($\Theta$) and a formation azimuth angle ($\Phi$) describe a relationship between the Earth coordinate system 20 and the formation coordinate system 21. Typically, the formation dip angle ($\Theta$) and the formation azimuth angle ($\Phi$) are determined by use of inversion processing. A tool coordinate system 22 is depicted in FIG. 4B.

Figure 4B:
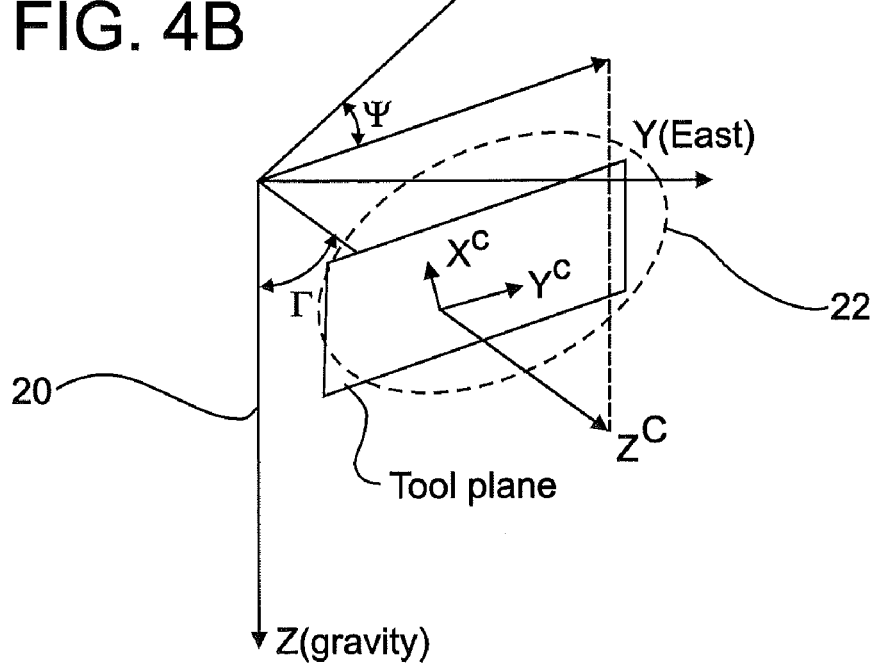

Referring to FIG. 4B, a z-axis $Z^t$ of the tool coordinate system 22 describes the trajectory of the wellbore 1 and is normal to a tool plane. The x-axis $X^t$ and the y-axis $Y^t$ of the tool coordinate system 22 are on the tool plane, each of the axes ($Z^t$, $X^t$, $Y^t$) being orthogonally oriented. The relation of the tool coordinate system 22 to the Earth coordinate system 20 is described by a tool dip angle ($\Gamma$) and a tool azimuth angle ($\Psi$).

Figure 5:
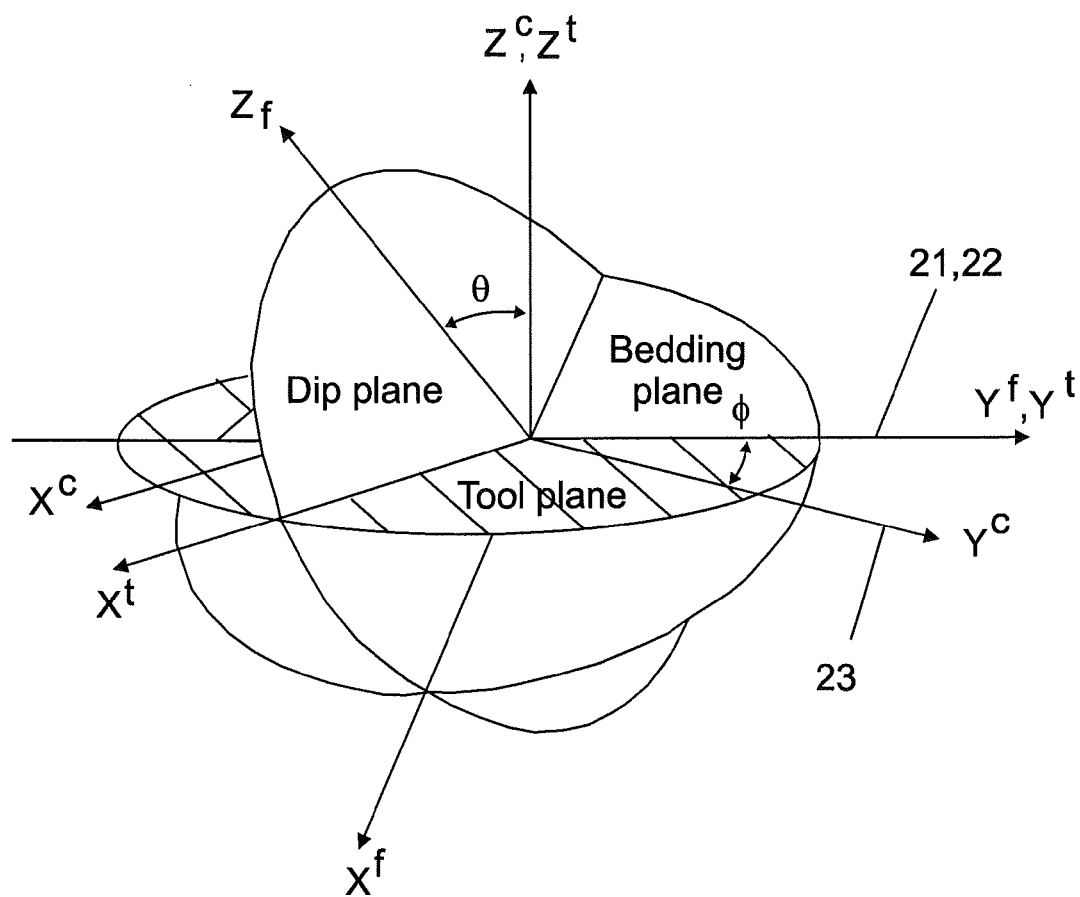
FIG. 5 depicts a combination of the coordinate systems.

A combination of coordinate systems is depicted in FIG. 5. More specifically, the formation coordinate system 21, the tool coordinate system 22 and a coil coordinate system 23 are depicted in relation to each other. Referring to FIG. 5, a dip plane is also shown. The dip plane is described in the coil coordinate system 23, and includes an x-axis $X^c$, a y-axis $Y^c$ and a z-axis $Z^c$. The z-axis $Z^c$ of the coil coordinate system 23 shares the same z-axis $Z^t$ as the tool coordinate system 22, while the y-axis $Y^c$ of the coil coordinate system 23 is offset from the y-axis $Y^f$ of the formation coordinate system 21 by the formation azimuth angle ($\Phi$). A relative tool rotation angle ($\phi$) (not shown in FIG. 5) is described by the x-axis $X^c$ for the coil coordinate system 23, with respect to the high side of the wellbore 1.

In operation, the tool 10 measures co-axial and co-planer components called main components, and also measures cross-components. These measurements provide information to determine, among other things, resistivity and anisotropy of the formation 3. With this information, other salient information may be obtained or derived. For example, with tool orientation data, the formation dip angle ($\Theta$) and the formation azimuth angle ($\Phi$) can be obtained. As disclosed herein, algorithms based on and operational within neural networks can be used advantageously to check data quality and determine the formation dip angle ($\Theta$) and the formation azimuth angle ($\Phi$) in real-time, or near real-time.

As discussed herein, the term "anisotropy" relates to a property of being directionally dependent, while "isotropy" indicates homogeneity in all directions. Anisotropy indicates a difference in a physical property (absorbance, refractive index, density, etc.) for some material when measured along at least one axis.

As used herein generation of data in "real-time" is taken to mean generation of data at a rate that is useful or adequate for making decisions during or concurrent with processes such as production, experimentation, verification, and other types of surveys or uses as may be opted for by a user. One non-limiting example includes information that is collected and provided at a rate that is adequate to aid in geosteering during a drilling operation, and to make at least some desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

As further context for the teachings herein, consider aspects of propagation resistivity compensation schemes. A first embodiment of a compensation scheme uses standard coaxial-component measurements and responses from two symmetric transmitters. The scheme calls for numerically averaging responses to suppress noise in the signals. A second embodiment, referred to as an "Azimuthal Propagation Resistivity (APR)" scheme uses cross-component measurements (having sixteen (16) sectors of rotation) and two symmetric transmitters to provide compensation. In this embodiment, signals can be either averaged or subtracted from each other.

In general, the term "azimuth" as used herein relates to an angle measured clockwise from any meridian or horizontal plane of reference, and is selected to indicate a direction of interest (such as to reserves of hydrocarbons 5).

Figure 6B:
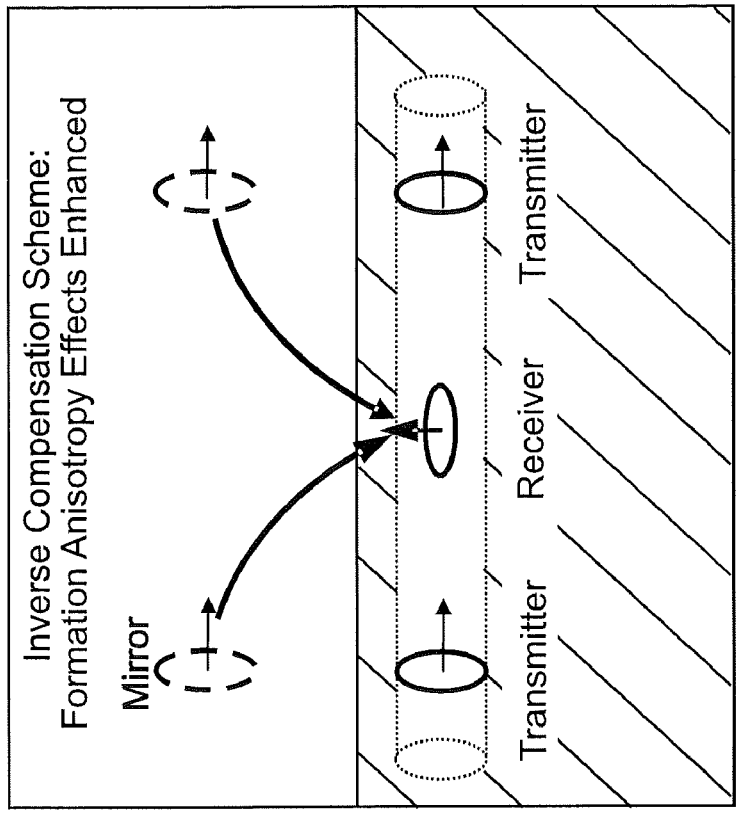
FIG. 6A and FIG. 6B, collectively referred to herein as FIG. 6, depict embodiments for compensating for azimuthal propagation resistivity (APR) cross component measurements.
Figure 6A:
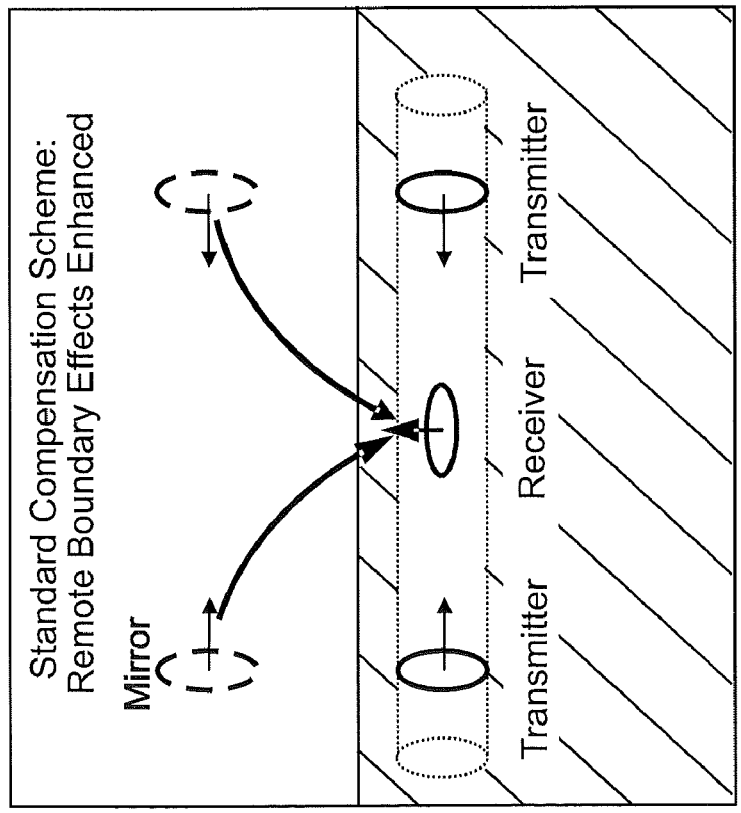

Aspects of the two different ways of compensating measurements are illustrated in FIG. 6. The transmitters in the lower bed induce eddy currents in the upper bed. This effect can be represented by mirror image (dashed loops) transmitters in the upper bed which interact with the cross-coil receiver. When the responses from the two symmetric image transmitters are subtracted (FIG. 6B), the anisotropy effects on the measurement from the nearby formation are greatly reduced (in the case of a thick, homogeneous anisotropic formations, the effects are totally removed). At the same time, the remote boundary effects are enhanced, making it easier to detect distant reservoir boundaries. This is referred to as the "standard" compensation scheme.

When the responses from the two symmetric transmitters are averaged (FIG. 6B), the formation anisotropy effects are relatively enhanced. At the same time, the remote boundary effects are reduced or canceled out, making their effects minimal on the nearby formation response. This is referred to as an "inverse" compensation scheme. Note that in both the standard (FIG. 6A) and inverse compensation (FIG. 6B) schemes, signal noise including the constant electronic drift noise is mostly reduced or removed by fitting the sixteen sectors of azimuthal data to a cosine or sine function, rather than averaging the signals from two transmitters.

It has been shown that deep reading images of remote boundaries can be created from the standard compensation scheme to interpret reservoir structure and to provide information for geosteering during drilling of the wellbore 1. In the same way, resistivity images can be created from the inverse compensation scheme (FIG. 6B) to create an anisotropy orientation image (an "AO image"). Note that the inverse compensation is not necessary when no boundary exists or the instrument 10 is at a certain distance away from a boundary of the reservoir. Accordingly, FIG. 9 provides an exemplary method for obtaining the AO image.

Figure 9:
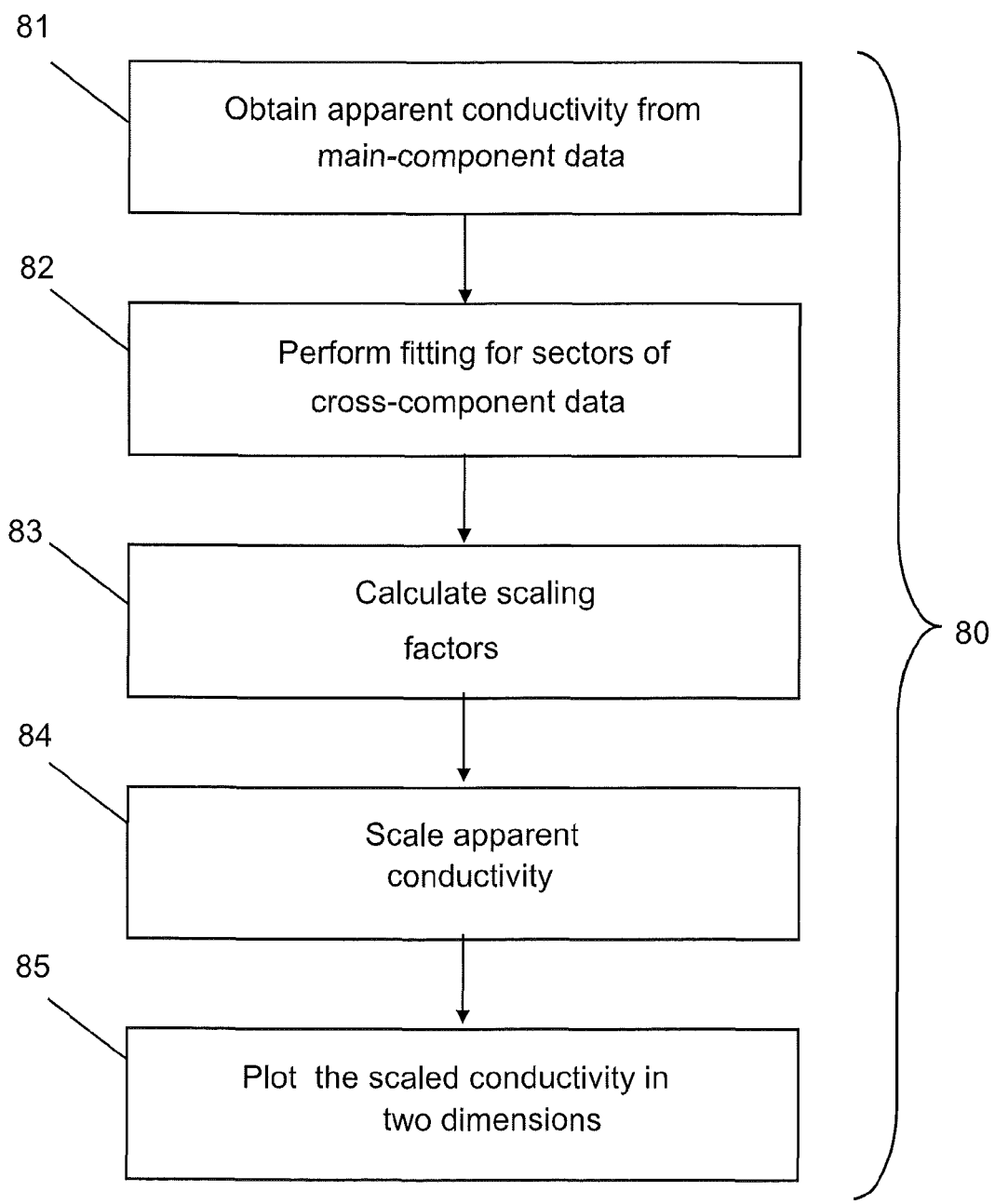
FIG. 9 is a flow chart providing an exemplary method for obtaining anisotropy orientation imaging.

As shown in FIG. 9, a method for creating an anisotropy image 80 include, in a first stage 81, obtaining an apparent conductivity curve from main-component measurements. In a second stage 82, performing curve fitting for the various sectors (in this case, sixteen sectors) of cross-component measurement data to remove any possible constant drift for each depth (there is no need to undertake this when there is little or no drift). In one embodiment, cosine fitting is performed as the curve fitting. Other types of curve fitting may be performed. In a third stage 83, calculating the scaling factors from the processed sector data. In a fourth stage 84, scaling the apparent conductivity or its logarithm value by either multiplying or dividing the factors according to the sign of APR quadrature data at the zero sector. In a fifth stage 85, plotting the data to construct the image.

Generally, cosine fitting considers cross-component measurements made at a plurality of toolface angles which are processed to remove bias. The amplitude of the resulting sinusoid is used to estimate a distance to an interface in an earth formation. An example of cosine fitting suited for the embodiments disclosed herein is disclosed in U.S. Pat. No. 7,375,530, entitled "Method for signal enhancement in azimuthal propagation resistivity while drilling," issued May 20, 2008 and incorporated by reference herein in its entirety.

One skilled in the art will recognize that sine fitting may be performed in lieu of cosine fitting with similar results. Accordingly, cosine fitting, sine fitting, and fitting with other circular functions may be performed as deemed appropriate.

Curve fitting is performed, among other things, in recognition of the fact that the effect of a misalignment of at least one coil results in a constant value (i.e., systematic error) to the principal cross-component in a homogenous isotropic medium. Using this fact, and the fact that the magnitude of the principal cross-component signal in a layered earth formation varies systematically with the toolface angle, curve fitting may be applied to substantially reduce effects of the misalignment. First, it is noted that variation of signals for a multi-component induction logging tool is sinusoidal in nature, and a function of toolface angle.

In cosine or sine fitting, curve fitting is performed using the measured values of the $H_{zx}$ signal as a function of toolface angle. The toolface angle is measured by using a suitable orientation device such as a magnetometer or an accelerometer. In one embodiment, measurements are made sixteen times over a single rotation of the tool, (i.e., over 360 degree rotation). Denoting by $f_i$ the measured signal at toolface angle $\theta_i$, the following quantities are computed in Eqs. (1) through (5):

$$\mathcal{R} = \frac{1}{\pi} \sum_{i=1}^{16} f_i \cos\theta_i \tag{1}$$

$$\mathcal{J} = \frac{1}{\pi} \sum_{i=1}^{16} f_i \sin\theta_i \tag{2}$$

$$\Phi = \tan^{-1}\left(\frac{\mathcal{J}}{\mathcal{R}}\right) \tag{3}$$

$$A = \sqrt{\mathcal{R}^2 + \mathcal{J}^2} \tag{4}$$

and $$f_i^* = f_i - \frac{1}{16} \sum_{i=1}^{16} f_i \tag{5}$$

The quantity A represents the amplitude of the sinusoidal signal and is what is used as a distance indicator to a boundary of a bedding plane. The quantity $\Phi$ is indicative of a direction to the bed boundary. The term $$\frac{1}{16} \sum_{i=1}^{16} f_i$$

on the right side of Eq. (5) represents a bias in the measurements. As noted above, the number sixteen (16) reflects a number of sectors determined for a rotation.

Those versed in the art would recognize that in addition to coil misalignment, bias could also be due to drift in the amplifier gains and other systematic electronic noise. In addition to the bias, measurements may also be corrupted by random noise that is uncorrelated from one measurement to the next. The fitting procedure described above smoothes the effect of random noise and greatly reduces the effect of the bias. It should further be noted that the bias removal/sinusoidal curve fitting may be used in conjunction with measurements made with either a single transmitter or the dual transmitter arrangements, and with the in-phase or the quadrature signal components. It should further be noted that the method of bias removal and sinusoidal curve fitting is not limited to the principal cross-component measurements and may be used with other components such as the xx-, and yy-components.

Figure 7A:
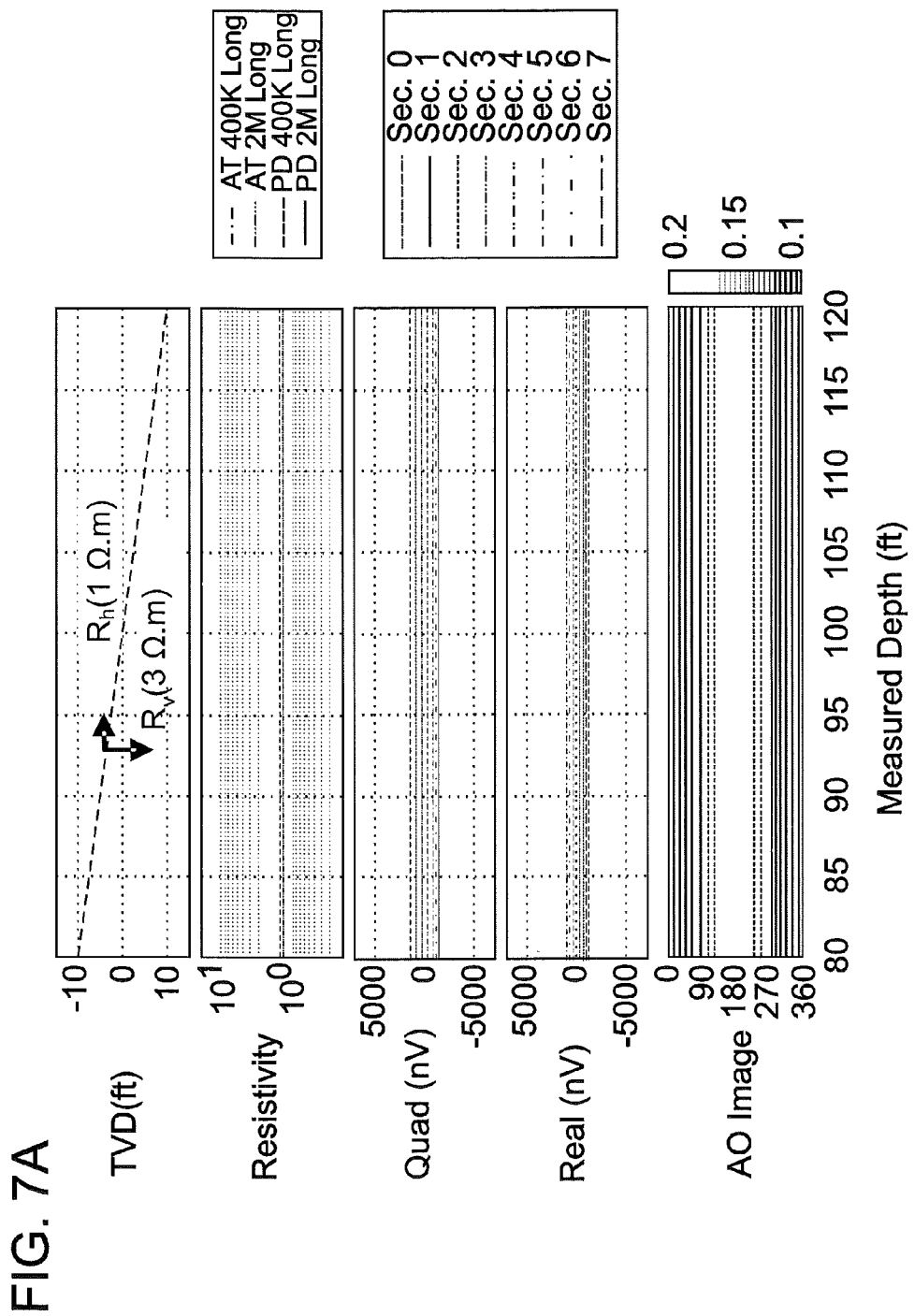
FIG. 7A and FIG. 7B, collectively referred to herein as FIG. 7, depict profiles of APR responses and the anisotropy orientation images in a uniform transversely isotropic formation ($R_h$=1 Ohm-m, $R_v$=3 Ohm-m) with down or up drilling profiles.
Figure 7B:
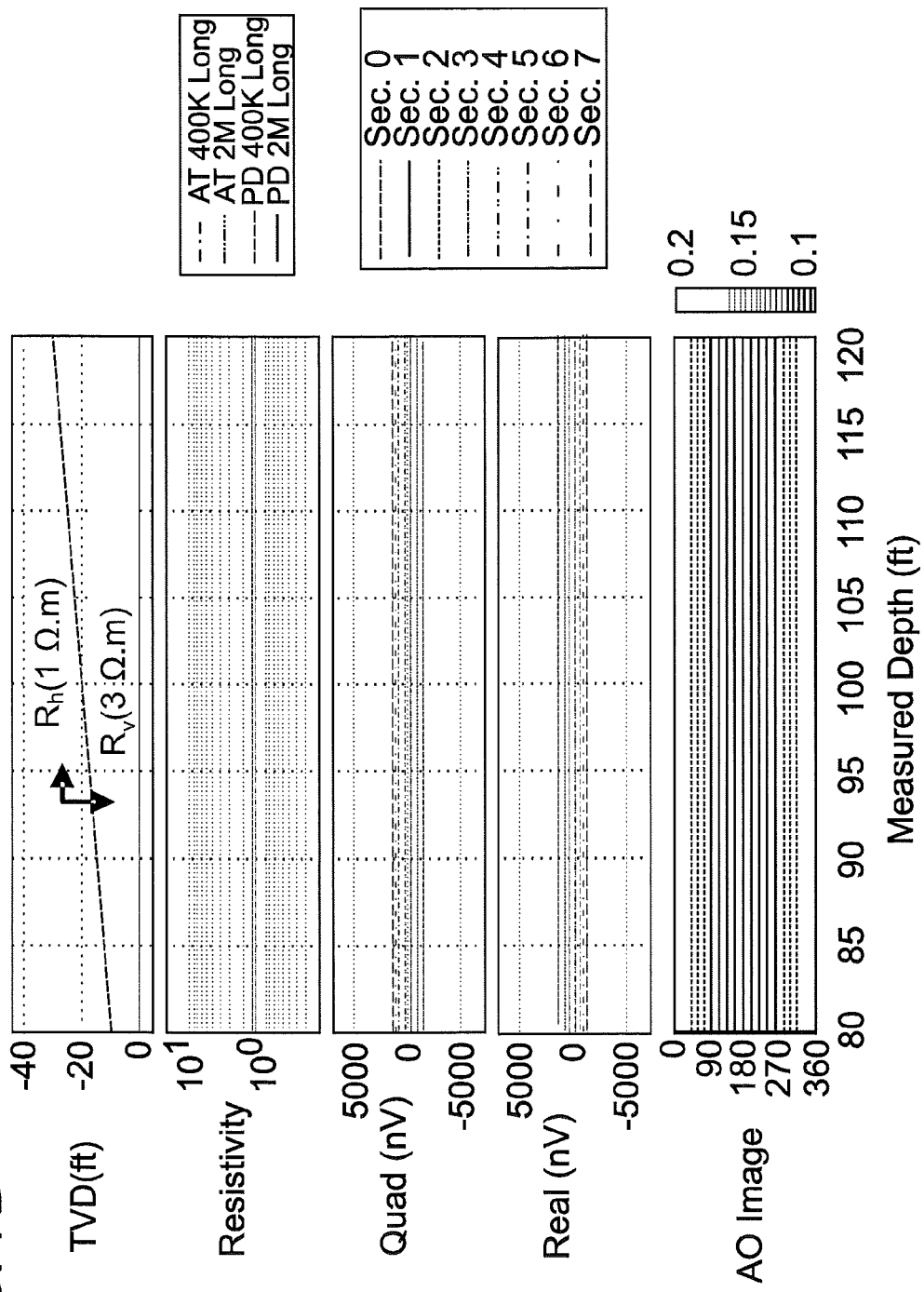

FIG. 7 shows responses for the standard propagation resistivity (FIG. 7A) and inverse compensated APR cross-components (FIG. 6B), along with the associated anisotropy orientation images for an anisotropic formation 3. In this example, the horizontal and vertical resistivities are 1 Ohm-m and 3 Ohm-m, respectively. The formation dip and azimuth angles are both zero degrees. The inclination of the wellbore 1 (shown as a line in the TVD track) is 60 degrees in the FIG. 7A and 120 degrees in FIG. 7B. Note that the standard-coaxial component responses have identical curve separation in both plots. In both cases, the 400 kHz attenuation curve reads about 1.37 Ohm-m and the 2 MHz phase difference curve reads about 1.81 Ohm-m. The imaginary (quadrature) APR signal strength is about 1375 nV whereas the real APR signal strength is about 1245 nV. Note that the signs of the signal responses from the individual sectors (only 8 shown here for simplicity), are inverted between the two plots.

For FIG. 7A, (the 60 degree dip plot), the AO image appears to show a conductive bed (dark color) above the wellbore (outer edges of the image). In contrast, in FIG. 7B (the 120 degree dip plot), a conductive bed appears to be coming from below the wellbore 1 (center of image). Recalling the sign reversal in the sectors from APR signal for the two plots, it may be seen that there is also a sign or direction reversal in the image. In the case of anisotropy orientation images, the orientation of the apparent conductive bed indicates the direction of the wellbore 1 with respect to the formation anisotropy dip. An apparent conductive bed coming from above indicates that the well is being drilled "down-dip" with respect to the formation, whereas an apparent conductive bed coming from below indicates that the well is being drilled "up-dip." Furthermore, the orientation (in degrees) of the apparent conductive bed in the anisotropy orientation image indicates the relative azimuth of the formation the wellbore 1 is in. Both of these pieces of information are extremely useful for making geosteering decisions. This is especially the case for formations 3 where no immediate boundary is evidenced to help understand structural changes in the formation 3.

In the image, orientation of an apparent conductive bed (dark color) may indicate a direction of a wellpath with respect to the anisotropy dip of an anisotropic formation. An apparent conductive bed coming from above will generally indicate that the well is being drilled "down-dip" with respect to the formation, whereas an apparent conductive bed coming from below will generally indicate that the well is being drilled "up-dip." Furthermore, the orientation (in degrees) of the apparent conductive bed in the image may indicate the relative azimuth of the formation. The darkest color may be chosen to reflect the horizontal resistivity while the lightest color would then represent the geometrical mean of horizontal and vertical resistivities. To remove or reduce the boundary effects, the responses from two transmitters in a dual symmetric transmitter system may be averaged to achieve a better anisotropy orientation image. The similar image that reflects the horizontal and vertical resistivities, formation anisotropy dip and azimuth can be constructed from the inversion results of multi-component tools for both wireline and logging-while drilling (LWD) applications.

Other useful information can also be derived from the anisotropy orientation images. For example, it may be recalled that the APR cross-component responses go to zero when the wellbore 1 is orthogonal or parallel to the formation dip. These means that the azimuthal response from the different APR sectors in the images will disappear and the image should show a single bed with a color representing the apparent (measured) resistivity of the formation for each case. So when geosteering parallel to the formation anisotropy dip, the apparent conductive bed should disappear. In the case of anisotropy orientation images, the width of the apparent conductive bed indicates amount of wellpath deviation away from the formation dip. As the wellbore deviates away from the anisotropy dip of the formation 3, the conductive bed will appear and then thicken on the image until finally, when the wellbore is perpendicular to the formation 3 (e.g. a vertical well), only the single apparent conductive bed will be seen. Note that the image color of the conductive bed represents the horizontal resistivity ($R_h$) as one would expect in the perpendicular borehole case. Otherwise, the color of the conductive bed actually approaches an apparent resistivity equivalent to $\sqrt{R_v R_h}$ which is in the case of a parallel wellbore. In other words, for various embodiments, extremes in image coloration represent the horizontal resistivity (in this case, the darker, more conductive area) and a geometric mean of the vertical and horizontal resistivities (the brighter, more resistive area).

Of course, visual aids used in graphic depictions, such as the selection of colors, may be chosen according to the needs or preferences of a designer, manufacturer and/or user. It is expected that a compliment of colors, shading, patterns, shapes and other such visual aids as are generally known in graphic depictions are available for selection as deemed appropriate.

The well inclination is 60 degrees in the left plot and 120 degrees in the right plot. The tracks from top to bottom are: well trajectory, standard coaxial-component resistivity, APR cross-component quadrature (imaginary) signal, APR cross-component real signal, and anisotropy enhanced APR image (Anisotropy Orientation image).

Figure 8:
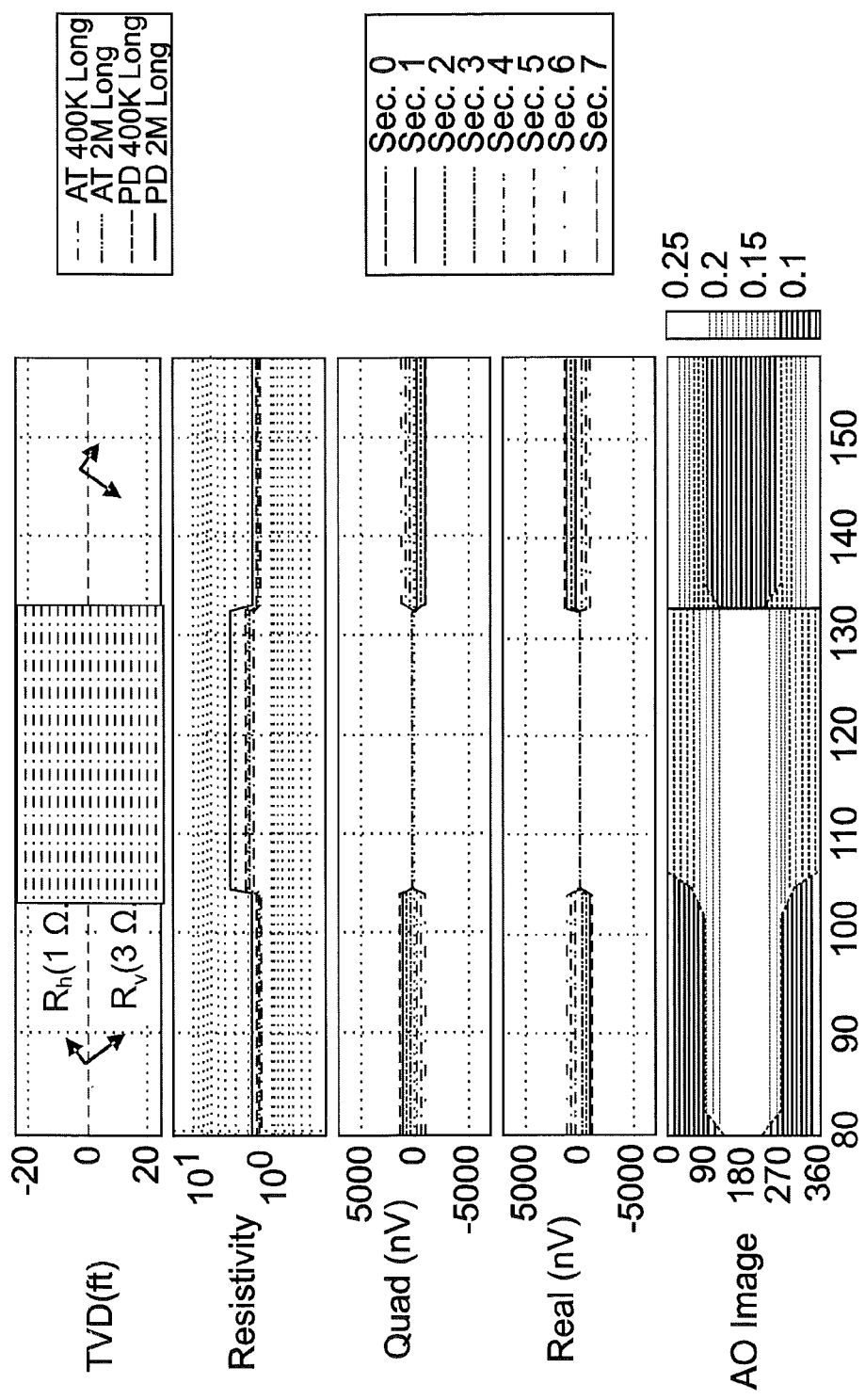
FIG. 8 provides exemplary anisotropy orientation images for three segments of different anisotropy orientations. The arrows labeled $R_h$ and $R_v$ show the orientation of the local anisotropic medium.

A synthetic example to validate anisotropy orientation image interpretation is provided. Referring to FIG. 8, there are shown responses and calculated results for a uniform, anisotropic medium with $R_h$=1 Ohm-m and RV-3 Ohm-m. The true formation anisotropy dip angles are 30, 2, and 30 degrees respectively and the corresponding true formation anisotropy azimuth angles are 0, 0, and 180 degrees. The dip and azimuth of the borehole trajectory are 90 and 0 degrees. The APR derived anisotropy orientation image shows that drilling is performed down-dip when the relative dip (angle between the normal direction of formation and the borehole trajectory) is less than 90 degrees up-dip otherwise. It is also clear that the width of the apparent conductive bed feature increases when the wellbore 1 deviates from the formation dip. Finally, it can be seen that the color of the darker, more conductive feature in the image reflects the horizontal resistivity value, $R_h$, whereas the brighter more resistive areas reflect the geometrical means of vertical and horizontal resistivities, $\sqrt{R_v R_h}$. The latter can be seen more clearly in the thicker, bright zone when the borehole 2 is close to parallel to the formation dip (2 degrees).

For convenience of referencing and to establish clarity, certain nomenclature as used herein is now presented. As used herein, the following variables generally are applied, and defined as follows:
  x, y, z axis directions of the orthogonal Cartesian coordinate system
  x, y axis in the plane of bedding/lamination; horizontal axis
  z axis perpendicular to the plane of bedding/lamination, vertical axis)

Rx, Ry, Rz true specific electrical resistivities of the formation in the three axis directions; and Θ, Φ, Ψ, Γ, φ Euler's angles.

It should be noted that with regard to any errors or inconsistencies between this reference information and other information provided herein, that common sense and logic should govern. Accordingly, in some instances, this reference information may be inconsistent with other portions of this disclosure.

In support of the teachings herein, various analysis components may be used, including a digital system and/or an analog system. The system(s) may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), a motive force (such as a translational force, propulsional force or a rotational force), a sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for providing an image of a formation surrounding a wellbore, the method comprising:
    obtaining a curve from main components of resistivity measurements of the formation;
    fitting cross-components of the resistivity measurements;
    calculating scaling factors from the cross-component data;
    scaling apparent conductivity data by the calculated scaling factors, wherein scaling the apparent conductivity data includes scaling the apparent conductivity by either multiplying or dividing the scaling factors according to a sign of azimuthal propagation resistivity quadrature data at a zero sector; and
    plotting the scaled conductivity data to provide the image of the formation.

2. The method as in claim 1, wherein the curve comprises one of an apparent conductivity curve and a conductivity curve.

3. The method as in claim 1, wherein the measurements are collected by at least one of a multi-component induction tool and an azimuthal propagation resistivity tool.

4. The method as in claim 1, wherein the fitting comprises one of cosine fitting and sine fitting.

5. The method as in claim 1, further comprising subtracting a response of one coil from a symmetric coil to provide the resistivity measurements.

6. The method as in claim 1, further comprising averaging a response of two symmetric coils to provide the resistivity measurements.

7. The method as in claim 1, wherein the image provides a dip angle for the formation.

8. The method as in claim 1, wherein a color in the image is selected according to at least one of a resistivity, an orientation, a dip angle and an azimuth angle.

9. The method as in claim 1, wherein a result of the plotting is received as an input to a geosteering apparatus.

10. The method as in claim 1, further comprising: eliminating drift by applying results of the fitting to the curve.

11. The method as in claim 10, wherein the drift comprises at least one of random error and systematic error.

12. The method as in claim 1, wherein the resistivity measurements correlate to sectors of rotation for an instrument used to obtain the measurement data.

13. The method as in claim 12, wherein the image provides at least one of anisotropy information and azimuth information.

14. The method as in claim 13, wherein the anisotropy information comprises orientation of the anisotropy.

15. A system for imaging a formation surrounding a wellbore during a drilling procedure, the system comprising:
    a drill string comprising a logging instrument comprising at least one sensor for collecting resistivity measurement data; and
    a processor loaded with machine readable and machine executable instructions comprising instructions for obtaining a conductivity curve from main components of resistivity measurements of the formation; performing fitting for cross-components of the resistivity measurements; calculating scaling factors from the cross-component data;
    scaling apparent conductivity data by the calculated scaling factors, wherein scaling the apparent conductivity data includes scaling the apparent conductivity by either multiplying or dividing the scaling factors according to a sign of azimuthal propagation resistivity quadrature data at a zero sector; and providing input to a geosteering device.

16. The system as in claim 15, wherein the instrument comprises one of a multi-component induction tool and an azimuthal propagation resistivity tool.

17. The system as in claim 15, wherein the processor is equipped to provide the input in at least one of real-time and substantially real-time.

18. The system as in claim 15, wherein the processor is further equipped for controlling a power signal to the at least one sensor.

19. A non-transitory computer-readable medium having stored thereon a computer program product comprising computer executable instructions stored, the product comprising instructions to provide an image of a formation by:

obtaining a curve from main components of resistivity measurements of the formation;

fitting cross-components of the resistivity measurements;

calculating scaling factors from the cross-component data;

scaling apparent conductivity data by the calculated scaling factors, wherein scaling the apparent conductivity data includes scaling the apparent conductivity by either multiplying or dividing the scaling factors according to a sign of azimuthal propagation resistivity quadrature data at a zero sector; and plotting the scaled conductivity data to provide the image of the formation.

20. The non-transitory computer-readable medium in claim 19, further comprising instructions for outputting geosteering information.

* * * * *